United States Patent
Doedline, Jr. et al.

(10) Patent No.: US 11,474,704 B2
(45) Date of Patent: Oct. 18, 2022

(54) TARGET PATH SELECTION FOR STORAGE CONTROLLERS

(71) Applicant: ATTO Technology, Inc., Amherst, NY (US)

(72) Inventors: Thomas J. Doedline, Jr., West Seneca, NY (US); Paul C. Rogers, East Amherst, NY (US); Stephen W. Tallau, Amherst, NY (US); David A. Snell, Youngstown, NY (US)

(73) Assignee: ATTO Technology, Inc., Amherst, NY (US)

( * ) Notice: Subject to any disclaimer, the term of this patent is extended or adjusted under 35 U.S.C. 154(b) by 445 days.

(21) Appl. No.: 13/797,317

(22) Filed: Mar. 12, 2013

(65) Prior Publication Data

US 2013/0311719 A1    Nov. 21, 2013

Related U.S. Application Data

(60) Provisional application No. 61/688,639, filed on May 18, 2012.

(51) Int. Cl.
*G06F 3/00* (2006.01)
*G06F 3/06* (2006.01)

(52) U.S. Cl.
CPC .......... *G06F 3/0613* (2013.01); *G06F 3/0635* (2013.01); *G06F 3/0638* (2013.01); *G06F 3/0689* (2013.01); *G06F 2206/1012* (2013.01)

(58) Field of Classification Search
CPC .... G06F 3/0613; G06F 3/0635; G06F 3/0638; G06F 2206/1012; G06F 3/0689
See application file for complete search history.

(56) References Cited

U.S. PATENT DOCUMENTS

| | | | |
|---|---|---|---|
| 6,145,028 A * | 11/2000 | Shank et al. | 710/31 |
| 6,968,401 B2 | 11/2005 | McBrearty | |
| 7,032,041 B2 | 4/2006 | Sahara | |
| 7,275,103 B1 * | 9/2007 | Thrasher et al. | 709/224 |
| 7,603,507 B2 * | 10/2009 | Yagi et al. | 710/316 |
| 7,668,981 B1 * | 2/2010 | Nagineni et al. | 710/38 |
| 7,688,753 B1 * | 3/2010 | Zimran et al. | 370/252 |
| 7,873,783 B2 | 1/2011 | Takeuchi | |
| 8,122,120 B1 | 2/2012 | Athreya | |
| 8,200,872 B2 | 6/2012 | Johnson | |
| 8,204,980 B1 | 6/2012 | Sandstrom | |

(Continued)

OTHER PUBLICATIONS

Comparison and End-to-End Performance Analysis of Parallel File Systems, Sep. 2011.

(Continued)

*Primary Examiner* — Reginald G Bragdon
*Assistant Examiner* — Michael L Westbrook
(74) *Attorney, Agent, or Firm* — Michael J. Berchou, Esq.; Harter Secrest & Emery LLP

(57) ABSTRACT

A RAID controller attached to a storage network can detect the presence of multiple pathways to the same physical storage device. A path collection module can dynamically maintain all valid pathways to all attached storage devices. A path selection module can automatically and dynamically balance and rebalance desired paths to each storage device so as to simultaneously optimize data flow and provide continuity of I/O service throughout the attached storage network.

4 Claims, 7 Drawing Sheets

(56) References Cited

U.S. PATENT DOCUMENTS

| | | | |
|---|---|---|---|
| 8,381,027 B1* | 2/2013 | Liu et al. | 714/13 |
| 8,619,555 B2* | 12/2013 | Dallas et al. | 370/228 |
| 9,015,371 B1* | 4/2015 | Randhawa | G06F 13/4063 |
| | | | 710/38 |
| 2003/0023749 A1* | 1/2003 | Lee et al. | 709/240 |
| 2003/0182504 A1* | 9/2003 | Nielsen et al. | 711/114 |
| 2007/0143583 A1* | 6/2007 | Cors et al. | 713/1 |
| 2011/0016272 A1 | 1/2011 | Jeong | |
| 2012/0179846 A1 | 7/2012 | Haustein | |

OTHER PUBLICATIONS

Sun Fire V445 Server Administration Guide, Managing Disk Volumes, Chapter 6, Sun Microsystems, Inc., 2007.
Hitachi Dynamic Link Manager Advanced Software Datasheet, Data Path Protection and Centralized Management for Enhanced Performance and Nonstop Availability, Hitachi Data Systems Corporation, Sep. 2010.

* cited by examiner

_US 11,474,704 B2_

TARGET PATH SELECTION FOR STORAGE CONTROLLERS

CROSS-REFERENCE TO RELATED APPLICATION

The present application claims priority benefit of U.S. Provisional Patent Application No. 61/688,639 filed on May 18, 2012, entitled "RAID Group Aware Target Path Selection for Storage Controllers," which is hereby incorporated by reference.

FIELD OF THE INVENTION

The present invention relates generally to the field of network data storage devices, and more particularly to a RAID controller attached to a storage network and a method of using such a system.

BACKGROUND OF THE INVENTION

In a network environment, data generated by a workstation or server may be stored on remote devices. The data storage devices are connected to the workstation by a network, and data stored on these devices may be shared by a number of workstations. A Storage Area Network, hereafter referred to as a "SAN," consists of initiators, typically workstations or servers, and storage devices, such as a disk drive array or tape library. Each component of a SAN has an address which allows network storage traffic to be routed to and from the appropriate end nodes.

SANs may comprise a number of Serial Attached SCSI (SAS)—based or Serial Advanced Technology Attachments (SATA)—based storage devices. The computer bus interface for connecting to SAS and SATA storage is referred to collectively herein as "SAS/SATA." SAS/SATA based storage devices, including without limitation disk drives, tape drives, solid-state drives, optical storage and protocol expanders, may be connected to a SAN via a storage router, which provides protocol translation and storage device aggregation. A storage router may also be installed directly within a workstation or server.

A storage router provides capabilities for aggregation of like storage devices and presents those devices as single or multiple targets to the initiators. A storage router that aggregates storage devices into Redundant Arrays of Independent Disks (RAID) is hereafter referred to as a "RAID controller."

BRIEF SUMMARY OF THE INVENTION

The present invention provides a system, method and mechanism within a RAID controller for establishing a selected set of desired target paths in order to optimize data transfer to and from attached storage devices. The set of desired target paths can be dynamically updated without user intervention to maintain access to all RAID member devices and to optimize data flow through the system.

In one aspect the present invention comprises a RAID controller associated with a plurality of attached storage devices. An initiator I/O module receives data storage commands. A plurality of target ports communicate with attached storage devices. A network discovery module is configured to identify the storage devices. A storage device interface communicates with one or more of the storage devices. A RAID I/O module directs said data storage commands to the storage device interface. A path collection module maintains a set of active target paths available to the storage devices. A path selection module is operable to select desired target paths from the one or more of the active target paths. The path selection module is configured to automatically configure desired target paths to individual storage devices as a function of characteristic parameters of the active target paths. The RAID controller generates one or more storage device I/O requests to said storage devices using the desired target path determined by the path selection module.

While the invention is subject to various modifications and alternative forms, specific embodiments thereof are shown by way of example in the detailed description. It should be understood, however, that the detailed description is not intended to limit the invention to the particular embodiment which is described. This disclosure is instead intended to cover all modifications, equivalents and alternatives falling within the scope of the present invention.

DESCRIPTION OF THE PREFERRED EMBODIMENTS

Figure 1:
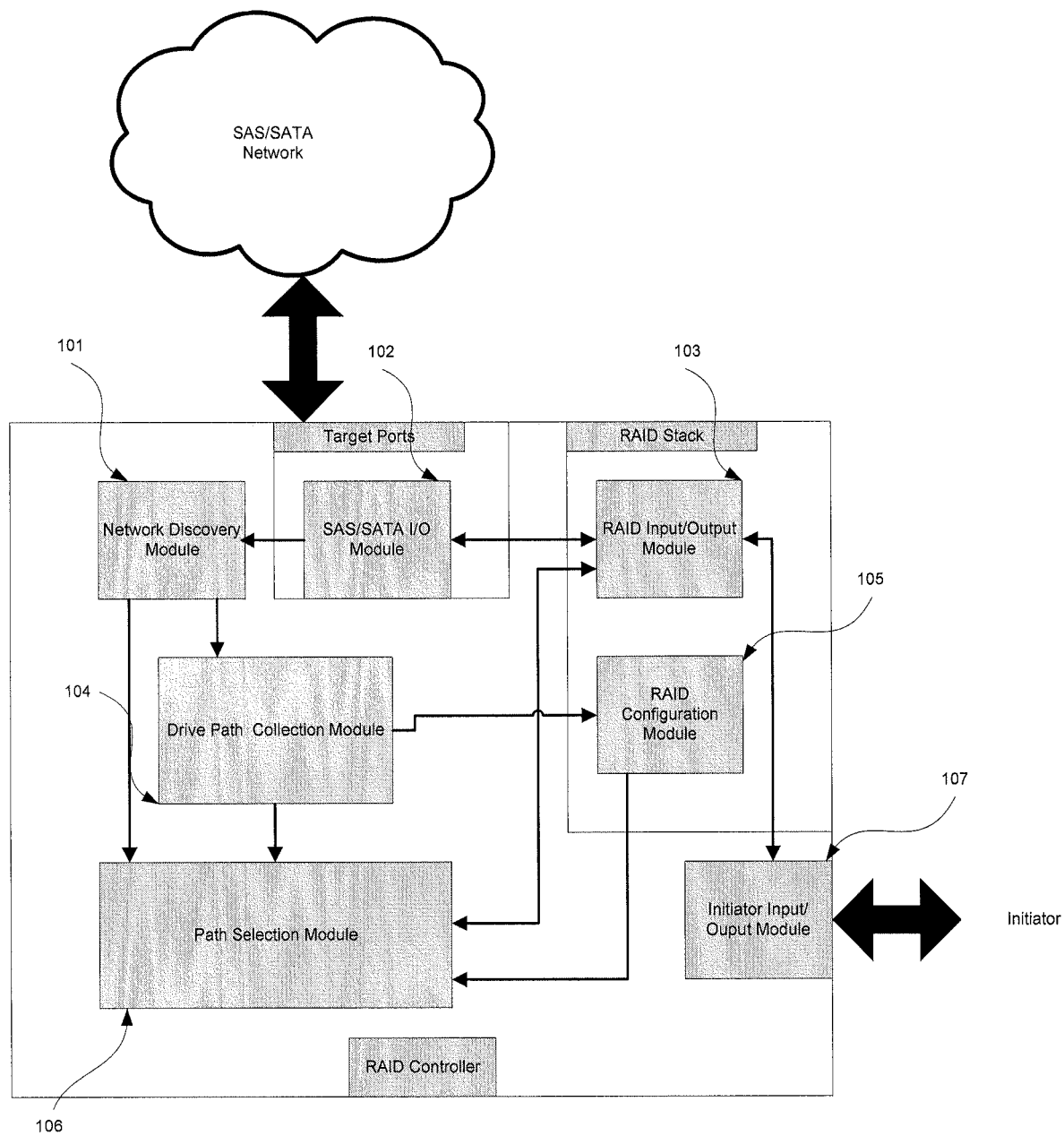
FIG. 1 illustrates the component modules that exist within a RAID controller necessary to provide target path selection functionality.

At the outset, it should be clearly understood that like reference numerals are intended to identify the same parts, elements or portions consistently throughout the several drawing figures, as such parts, elements or portions may be further described or explained by the entire written specification, of which this detailed description is an integral part. The following description of the preferred embodiments of the present invention are exemplary in nature and are not intended to restrict the scope of the present invention, the manner in which the various aspects of the invention may be implemented, or their applications or uses.

RAID controllers expose a number of targets to an initiator. Each target can represent a single storage device, a logical concatenation of two or more storage devices, or a logical concatenation of a portion of one or more storage devices. One or more exposed targets representing the grouping of one or more storage devices is henceforth referred to as a "RAID group." Grouping of storage devices into RAID groups may be configured manually by the user or automatically by the RAID controller. A RAID group configuration can be modified to include additional capacity through an "expansion" process. A RAID group configuration can be modified to provide a different form of redundancy through a "migration" process.

Each target exposed by a RAID controller is composed of one or more storage devices. Each storage device is connected to the SAN via an end point network device. When storage devices are directly connected to a SAS expander, the SAS expander is an example of an end point network device. Each storage device is uniquely identified by an assigned target address. Some examples of target addresses are Fibre Channel Worldwide Name (WWN), iSCSI Qualified Name (iQN) or Infiniband EUI-64. Mapping of the exposed targets of the RAID group to the SAN target address, and the presentation of the targets to the SAN, is the responsibility of the RAID controller and may be configured manually by the user or automatically by the RAID controller.

The SAS/SATA storage devices that comprise a RAID group, known as "RAID group members" may be housed in physical enclosures along with a SAS expander. A SAS expander communicates with multiple SAS devices, allowing a single SAS initiator port to connect with multiple SAS storage devices on a SAS/SATA network. Storage devices may support multiple connections to one or more SAS expanders or SAS ports. SAS/SATA based RAID controllers incorporate point-to-point connections between devices. Each point-to-point connection comprises a link, and the link between any two specific end points is controlled by a physical transceiver (PHY).

The exact route from a RAID controller through a combination of PHYs, expanders and SAS ports comprises a "target path." During the course of data transfer to/from a RAID group, when multiple target paths exist, the attached RAID controller may, in one aspect, select any valid path to the attached storage. The existence of multiple target paths can be exploited by the RAID controller to provide higher level management of the storage traffic to individual storage devices for the purpose of load balancing, failover and failback.

Generally, the invention comprises systems and methods for choosing the optimum path between a storage router and attached storage devices, whereby certain characteristics of target connections can be used by the storage router to maximize the available bandwidth to the active storage devices. These characteristics of target connections may include, but are not limited to RAID group member status, bandwidth capacity, PHY error rate, RAID group I/O load, level of service agreements with initiators, and storage device type. FIG. 1 shows the interaction of system modules used by the RAID controller to create and maintain optimal path selection to storage devices.

In FIG. 1, the Network Discovery Module 101, is responsible for determining the presence of attached storage devices. To determine the presence of attached devices, the network discovery module communicates with the SAS/SATA I/O module 102 to the SAN. Characteristics of each detected storage device are communicated from the Network Discovery Module 101 to the Drive Path Collection Module 104. The Drive Path Collection module 104 uses the supplied device characteristics to determine the number of physically unique storage devices attached to the RAID Controller and associates each physically unique storage device with its available target paths.

The Drive Path Collection Module 104 supplies information to both the RAID Configuration Module 105 and the Path Selection Module 106. The RAID Configuration Module 105 uses the RAID I/O Module 103 and the SAS/SATA I/O module 102 to issue additional queries to the discovered devices, thereby determining RAID group affiliation of each storage device. The Path Selection Module 106 aggregates the information supplied by the Network Discovery Module 101, Drive Path Collection Module 104, RAID Configuration Module 105 and RAID I/O Module 103 to determine the set of optimal paths to each attached storage device. Using a hierarchical method, the Path Selection Module 106 starts with the most path-constrained devices in the most pathway-constrained RAID group, and builds out a full set of desired paths for each attached storage device. These optimal path selections are in turn communicated to the RAID I/O module 103. The Initiator I/O module 107 accepts commands from direct- or SAN-attached host computers, copy managers, or internal RAID controller processes. It communicates with the storage devices through the RAID I/O module 103 using the current set of path selections from the Path Selection Module 106.

One embodiment comprises a system and method for applying RAID group aware selection criteria to determine the set of target paths that would provide for an optimal data flow to the discovered RAID group members. FIG. 1 illustrates the RAID controller in this environment. The Network Discovery Module 101 is responsible for determining the presence of attached storage devices. Based upon the discovered infrastructure, and in some cases the underlying storage protocol, the controller may detect a multitude of potential target paths to a unique storage device. A Drive Path Collection Module 104 aggregates target path information for all attached storage devices.

Figure 2:
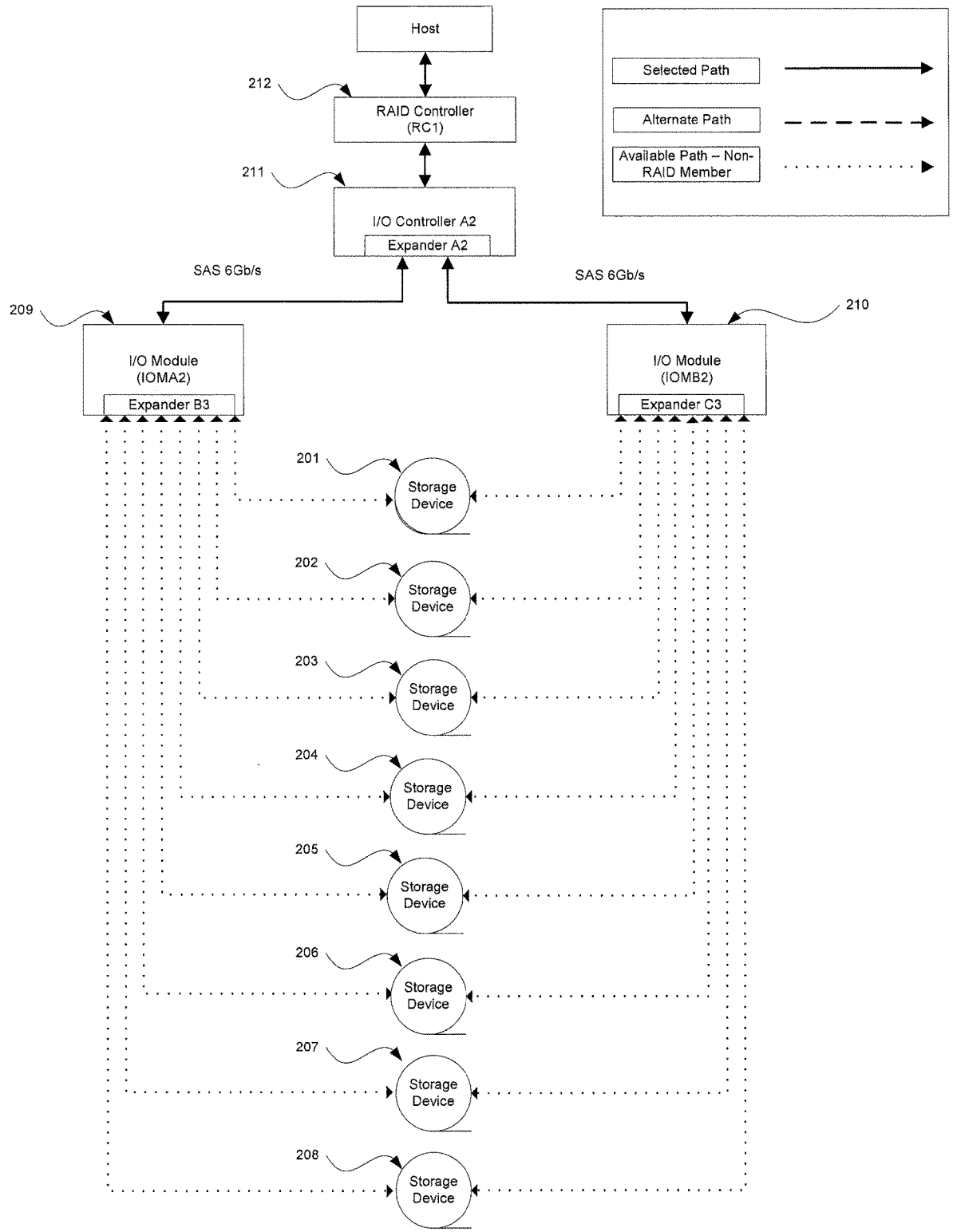
FIG. 2 illustrates a basic storage configuration consisting of a drive enclosure with two input channels and eight Dual Ported SAS storage devices.

In FIG. 2, for example, the Drive Path Collection Module 104 detects two target paths to each of the storage devices. In this illustration, 209 and 210 represent I/O modules which provide connectivity from the enclosure I/O Controller 212 to the dual ported storage devices 201 through 208, inclusive, through their expanders.

In another aspect of this invention the applied path selection criteria can account for discovered storage devices that are not active participants in any existing RAID group. By selecting paths for storage devices that are exclusively used as members of a RAID group, the RAID controller can more evenly balance the bandwidth needs of the attached storage devices.

Figure 3:
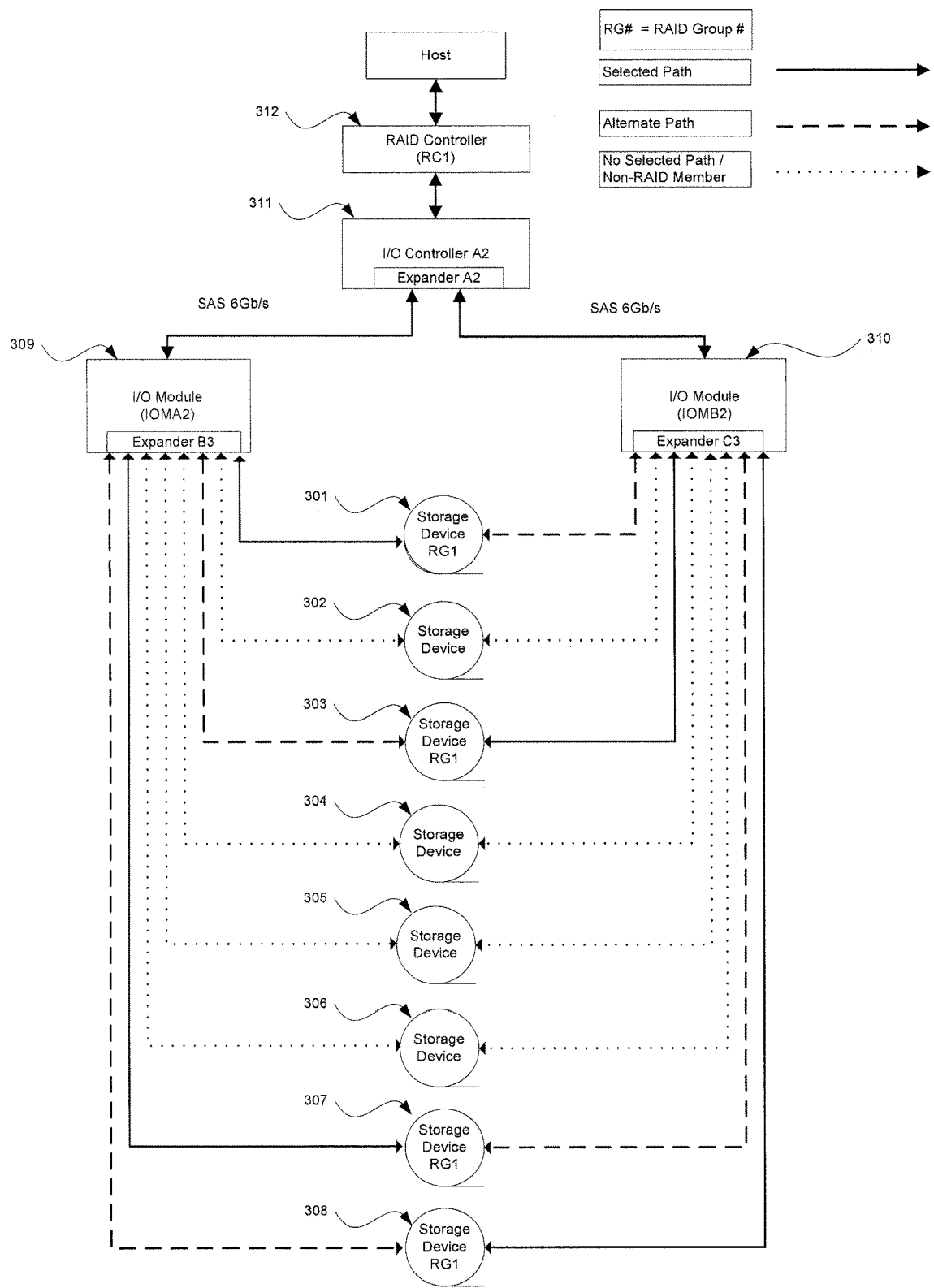
FIG. 3 shows the same configuration as FIG. 2 with the addition of selected and alternate target paths for an enclosure containing a single four member RAID group and four unassigned SAS storage devices.

FIG. 3 illustrates a basic single RAID group setup using only a subset of available storage devices, specifically devices 301, 303, 307 and 308. FIG. 3 shows the individual pathway selections that may be utilized by the attached RAID Controller 312 after the path selection criteria is applied. Storage devices 301 and 307 have a primary selected path via I/O Module 309 and each contains an alternate path through I/O module 310. Storage devices 303 and 308 utilize a primary path via I/O Module 310 with an alternate path through I/O Module 309.

In this illustration, the RAID Configuration Module 105 uses input from the Drive Path Collection Module 104 to determine which uniquely identified drives are assigned as members of a RAID group. At the completion of network discovery, the Path Selection Module 106 invokes RAID aware algorithms to select the preferred target path for each RAID member. The preferred target path is determined based upon input parameters supplied by the Network Discovery Module 101, the Drive Path Collection Module 104, and the RAID Configuration Module 105. These selected target paths are communicated to the RAID Input/Output Module 103, which coordinates data transfers to and from the storage devices.

Individual RAID groups within a RAID controller can be accessed at significantly different data transfer rates. In another aspect of this invention, the Path Selection Module 106 uses a RAID group aware path selection algorithm to balance the available bandwidth on storage devices that contain data for a plurality of RAID groups.

In a video application, for example, the RAID groups used for recording or playing back of video have greatly differing I/O profiles from RAID groups used to store operating systems, user applications or databases. In cases of multiple RAID groups, the Path Selection Module 106 makes an active decision to balance bandwidth using discrete RAID group instances as a driving parameter allowing the RAID Input/Output Module 103 to manage bandwidth allocation more efficiently through the SAS/SATA I/O Module 102. This RAID group centric approach provides for a set of optimal path selections that are independent of the I/O load of an individual RAID group.

Figure 4:
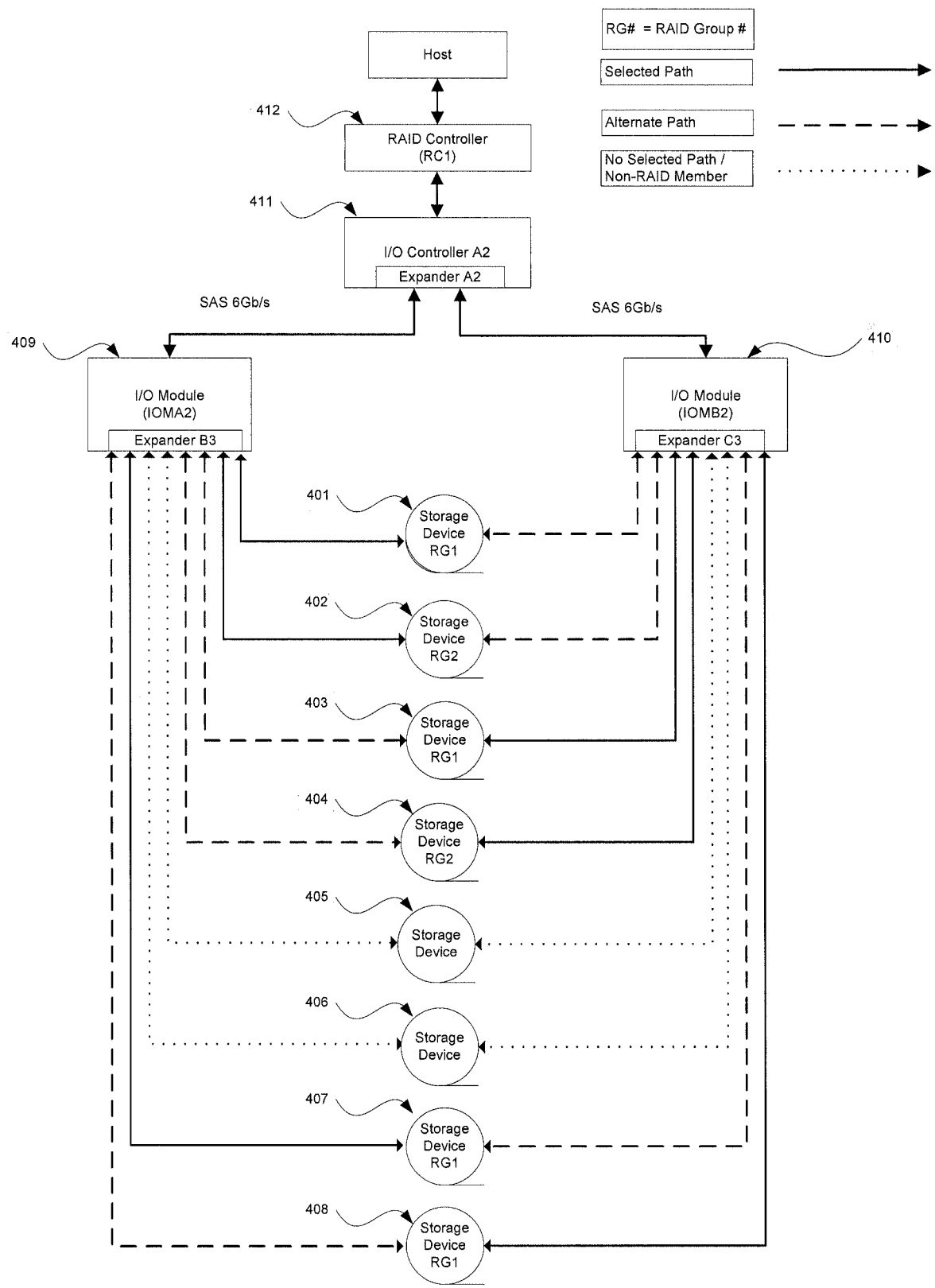
FIG. 4 illustrates the same configuration as FIG. 2 with the addition of selected and alternate target paths for an enclosure containing two RAID groups and two unassigned SAS storage devices.

FIG. 4 illustrates a configuration with two RAID groups using a subset of available disk drives for storage. In this figure, one RAID Group (RG1) is comprised of storage devices 401, 403, 407 and 408, while the second RAID Group (RG2) is comprised of storage devices 402 and 404. In this instance, the Path Selection Module 106 selects primary paths via I/O Module 409 for storage devices 401 and 407 from the first RAID Group and 402 from the second RAID Group. I/O Module 410 is the selected path for storage devices 403 and 408 from the first RAID Group and 404 from the second RAID Group. The selected paths shown balance based on two criteria: the aggregate number of drives accessed through I/O Modules 409 and 410, and the number of drives accessed through I/O Modules 409 and 410 for each individual RAID group.

Another embodiment of the invention comprises a system and method for dynamically selecting target paths to storage devices. During the course of normal operation of RAID controllers, certain triggering events may occur that would influence the Path Selection Module's 106 target path selections. Triggering events may include, but are not limited to, new RAID group discovery, target device failures, target path failures, target path additions, negotiated data rate changes and lost PHY bandwidth. In the presence of a triggering event, the Path Selection Module 106 gathers updated information from the Network Discovery Module 101, the Drive Path Collection Module 104 and the RAID Configuration Module 105 and makes updates to the target paths associated with each attached RAID group, adaptively managing the attached target devices for optimal bandwidth utilization.

Figure 5:
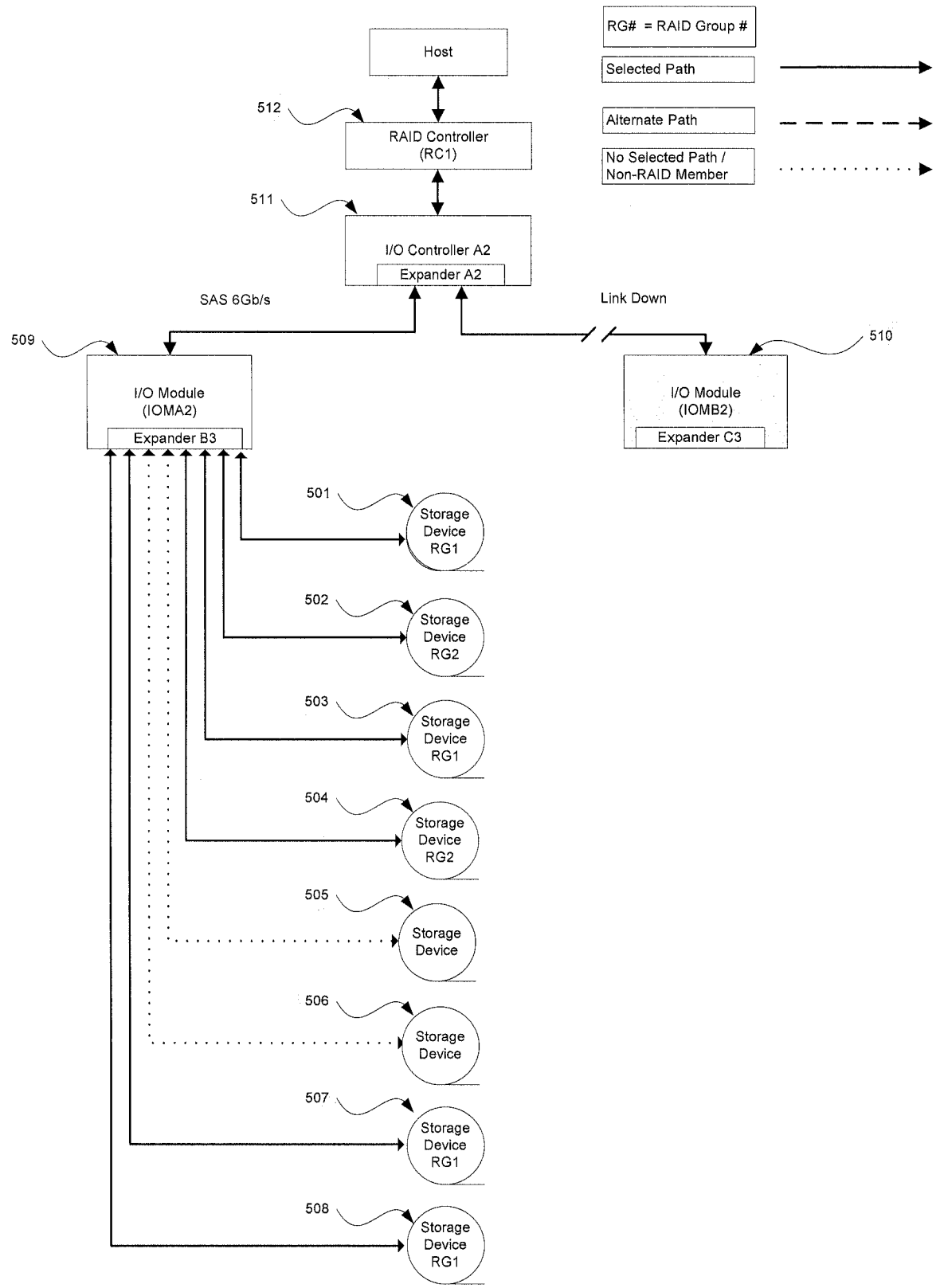
FIG. 5 shows the behavior of the target path selections in the event of SAS connection loss.
Figure 6:
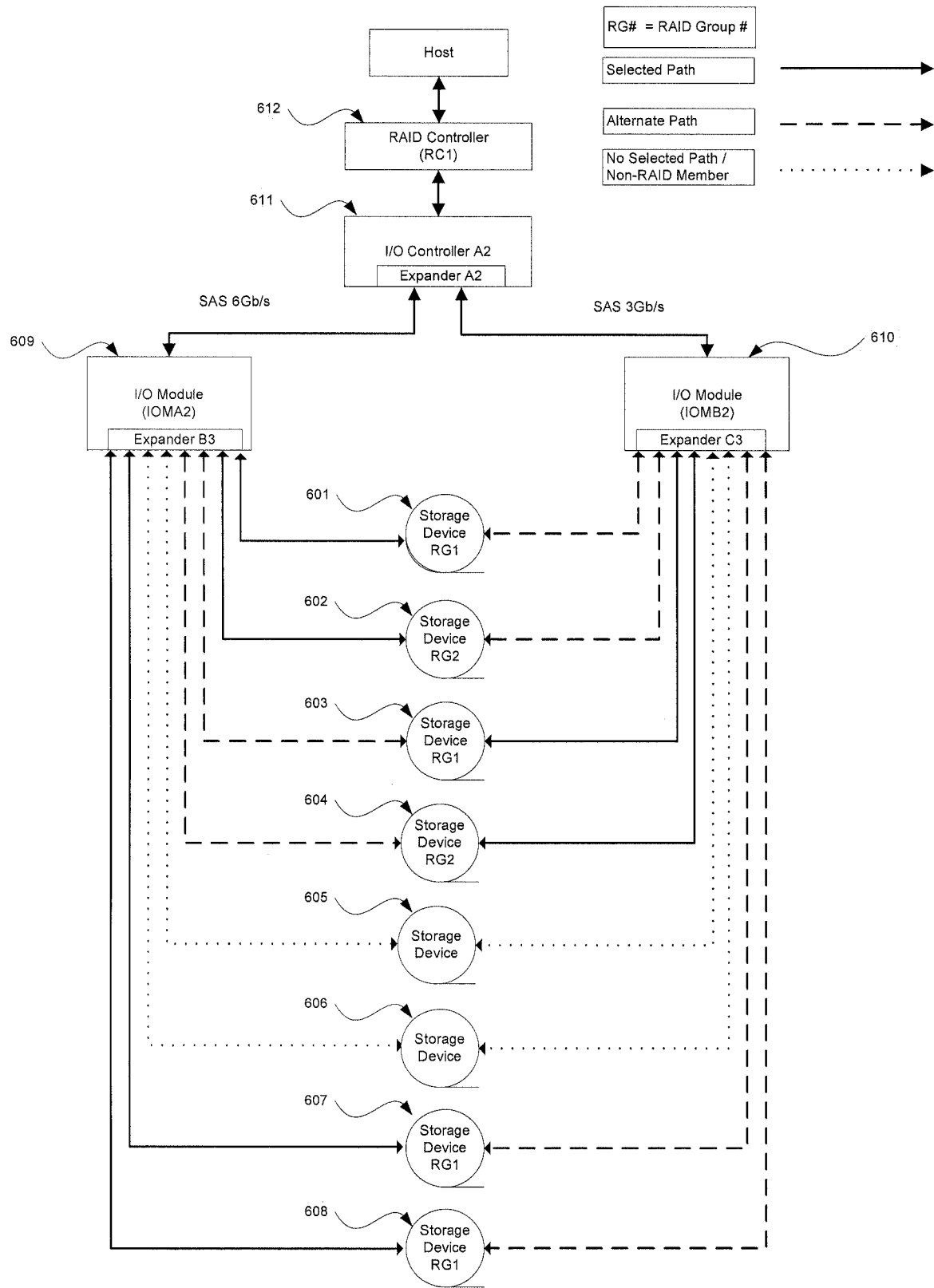
FIG. 6 shows the behavior of target path selections in the event of storage device re-connection at a slower negotiated data rate.

FIGS. 5 and 6 illustrate target path changes caused by triggering events. Using FIG. 4 as the base configuration, FIG. 5 represents the results of the Path Selection Module 106 output when the triggering event is the detection of a SAS Link failure between the expander of I/O Controller 511 and I/O Module 510. In this example all duplicate target paths are lost. The Path Selection Module's 106 updates cause the RAID Input/Output Module 103 to adapt to use the only remaining path, through I/O Module 509, for all RAID group member drives.

In FIG. 6 the SAS Link between the expander of I/O Controller 611 and I/O Module 610 is restored, but the negotiated data rate is half of the original data rate. In this example, the Path Selection Module 106 uses input from the Network Discovery Module 101 to accommodate the lower data rate by forcing the RAID Input/Output Module 103 to transition the selected path of a single target device from each RAID group, 603 and 604 onto the restored half-speed link. This adaptation, to transfer only a portion of the traffic to the slower link as compared to the original selected paths, shown in FIG. 4, results in a higher aggregate bandwidth under the constraints of the restored link.

A RAID controller may have a plurality of independent connections to the target devices. In another embodiment of this invention the SAS/SATA I/O Module 102 presents multiple connections to the SAS/SATA network. Each connection will identify itself on the SAS/SATA network with unique SAS Addresses. RAID controllers that exhibit this characteristic have the additional capability to control the flow of data through the set of PHYs contained within each physically cabled connection. The decision to expose individual cabled connections as separate SAS addresses can be utilized as another characteristic that the Network Discovery Module 101 supplies as input to the Path Selection Module 106.

Figure 7:
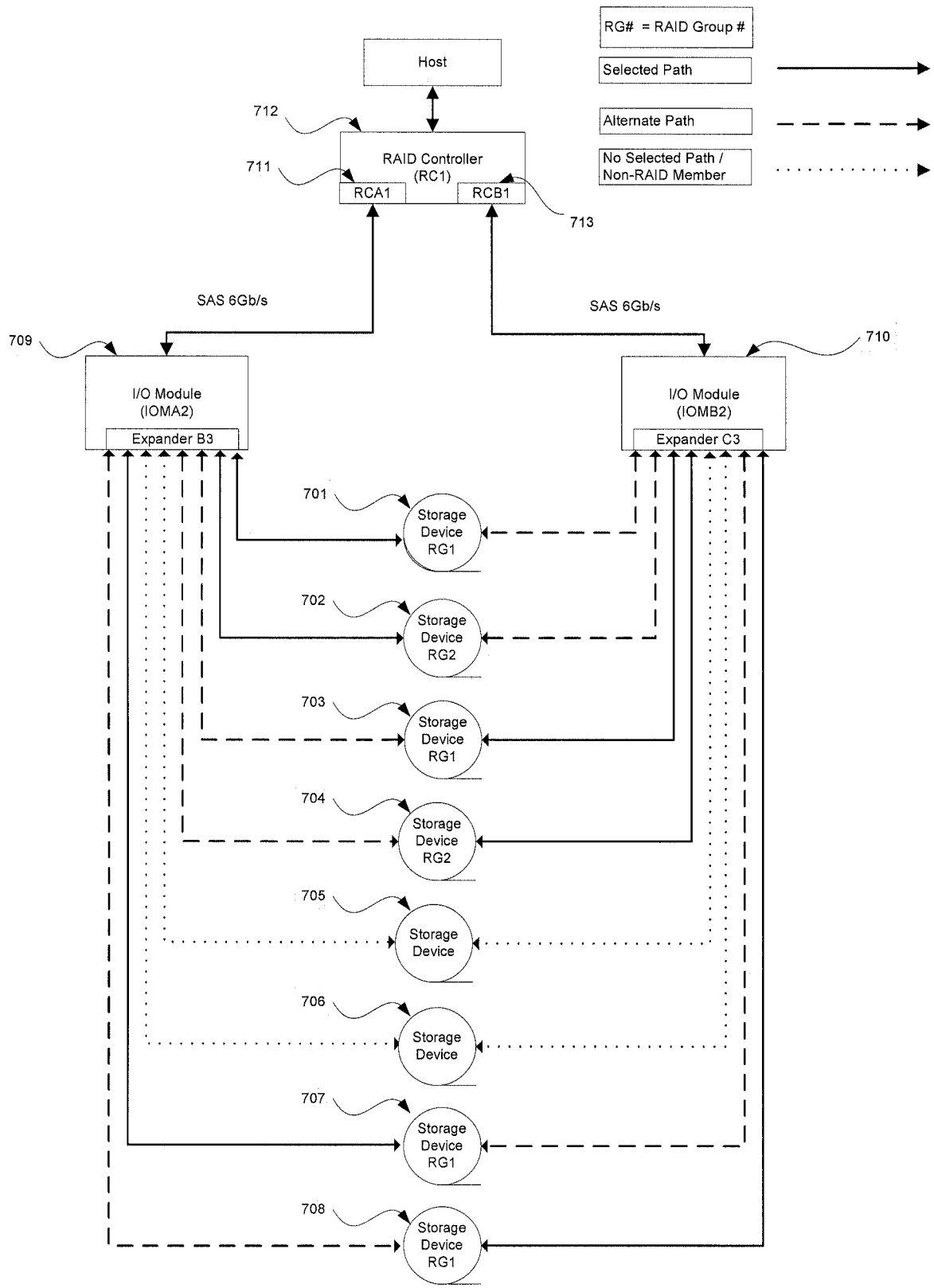
FIG. 7 describes a configuration where the RAID controller presents more than one independent SAS connection to the storage devices.

FIG. 7 illustrates a configuration where the RAID controller, 712, itself presents two independent, unique SAS Addresses. The path selections shown in FIG. 7 balance I/O through the two RAID controller SAS Ports 711 and 713, as well as, the final expander levels of I/O Modules 709 and 710.

An aspect of this invention is the capability of the Path Selection Module 106 to utilize specific SAN configuration details to generate optimized target paths to storage devices. SAN configuration details may consist of, but are not limited to, the number of PHYs through a particular pathway, partial pathway negotiated data rate, pathway segment count, calculated pathway bandwidth capacity, PHY error rate, attached device control protocol (SAS or SATA), number of concurrent STP connections supported on a particular pathway, end storage device type, and device connection type. The SAS/SATA storage devices provide SAN configuration details to the Network Discovery Module 101 through protocol specific discovery mechanisms. The Network Discovery Module 101 forwards configuration details to the Path Selection Module 106 for further refinement of target path selections.

In another aspect of this invention, the RAID Input/Output Module 103 provides Host I/O patterns to the Path Selection Module 106. The Path Selection module receives and actively analyzes the information from the Network Discovery Module 101, the Raid Input/Output Module 103 and the RAID Configuration Module 104 to make refinements to target path selections in real-time.

The present invention contemplates that many changes and modifications may be made. Therefore, while the presently-preferred form of the target path selection system has been shown and described, and several modifications and alternatives discussed, persons skilled in this art will readily appreciate that various additional changes and modifications may be made without departing from the spirit of the invention, as defined and differentiated by the following claims.

The invention claimed is:

1. A redundant array of independent disks (RAID) controller associated with a plurality of storage devices attached to said RAID controller, comprising:
   an initiator I/O module for receiving data storage commands;
   a RAID group comprising a plurality of storage devices;
   a network discovery module configured to identify members of said RAID group;
   a storage device interface communicating with one or more of said members of said RAID group;

a RAID I/O module directing said data storage commands to said storage device interface;

a path collection module maintaining a set of active target paths within said RAID group;

a RAID configuration module for maintaining RAID group aware selection criteria corresponding to said members of said RAID group;

a path selection module within said RAID controller operable to select desired target paths from one or more of said active target paths, wherein said path selection module is configured to automatically configure the desired target path to one of said members of said RAID group based on RAID group member status and at least one optimizing attribute;

wherein said initiator I/O module, network discovery module, RAID I/O module, path collection module, RAID configuration module and path selection module all reside within the RAID controller;

wherein said path collection module is configured to update said set of active target paths to said RAID group based on a characteristic triggering event received from one of said network discovery module, said path collection module, and said RAID configuration module;

wherein said path selection module is further operable to select a second desired target path from one or more of said updated active target paths, wherein said path selection module is configured to automatically configure said second desired target path to one of said members of said RAID group based on said at least one optimizing attribute;

wherein said RAID controller generates one or more storage device I/O requests to said members of said RAID group using one of the desired target paths determined by said path selection module;

wherein said path selection module balances bandwidth among said storage devices within said RAID group accessed through said RAID I/O module; and a second RAID group and a second RAID I/O module, wherein said path selection module balances bandwidth among said RAID member devices within said RAID group accessed through said RAID I/O module and said second RAID group accessed through said second RAID I/O module, said path selection module using discrete RAID group instances as a driving parameter allowing said RAID I/O module and said second RAID I/O module to manage bandwidth allocation to said storage devices, said bandwidth allocation providing path selections that are independent of I/O load of said RAID group and said second RAID group.

2. The RAID controller of claim 1, wherein said path selection module selects paths to said members of said RAID group and to members of said second RAID group based on an aggregate number of storage devices accessed through said RAID I/O module and through said second RAID I/O module and the number of storage devices accessed through said RAID I/O module and said second RAID I/O module.

3. A redundant array of independent disks (RAID) controller associated with a plurality of storage devices attached to said RAID controller, comprising:

an initiator I/O module for receiving data storage commands;

a RAID group comprising a plurality of storage devices;

a network discovery module configured to identify members of said RAID group;

a storage device interface communicating with one or more of said members of said RAID group;

a RAID I/O module directing said data storage commands to said storage device interface;

a path collection module maintaining a set of active target paths within said RAID group;

a RAID configuration module for maintaining RAID group aware selection criteria corresponding to said members of said RAID group;

a path selection module within said RAID controller operable to select desired target paths from one or more of said active target paths, wherein said path selection module is configured to dynamically reconfigure desired target paths to said members of said RAID group as a function of RAID group member status and at least one optimizing attribute;

wherein said initiator I/O module, network discovery module, RAID I/O module, path collection module, RAID configuration module and path selection module all reside within the RAID controller;

wherein said path collection module is configured to update said set of active target paths to said RAID group based on a characteristic triggering event received from one of said network discovery module, said path collection module, and said RAID configuration module;

wherein said path selection module is further operable to select a second desired target path from one or more of said updated active target paths, wherein said path selection module is configured to automatically configure said second desired target path to one of said members of said RAID group based on said at least one optimizing attribute;

wherein said RAID controller generates one or more storage device I/O requests to said members of said RAID group using one of the desired target paths determined by said path selection module;

wherein said path selection module balances bandwidth among said storage devices within said RAID group accessed through said RAID I/O module; and a second RAID group and a second RAID I/O module, wherein said path selection module balances bandwidth among said RAID member devices within said RAID group accessed through said RAID I/O module and said second RAID group accessed through said second RAID I/O module, said path selection module using discrete RAID group instances as a driving parameter allowing said RAID I/O module and said second RAID I/O module to manage bandwidth allocation to said storage devices, said bandwidth allocation providing path selections that are independent of I/O load of said RAID group and said second RAID group.

4. The RAID controller of claim 3, wherein said path selection module selects paths to said members of said RAID group and to members of said second RAID group based on an aggregate number of storage devices accessed through said RAID I/O module and through said second RAID I/O module and the number of storage devices accessed through said RAID I/O module and said second RAID I/O module.

* * * * *